M. B. SANBERG.
AUTOMOBILE SIDE CURTAIN.
APPLICATION FILED JUNE 9, 1920.

1,406,499.

Patented Feb. 14, 1922.

INVENTOR.
M. B. Sanberg.
BY
Wm H Mulligan
ATTORNEY.

UNITED STATES PATENT OFFICE.

MARTIN B. SANBERG, OF MIDDLE RIVER, MINNESOTA.

AUTOMOBILE SIDE CURTAIN.

1,406,499.     Specification of Letters Patent.     Patented Feb. 14, 1922.

Application filed June 9, 1920. Serial No. 387,647.

*To all whom it may concern:*

Be it known that I, MARTIN B. SANBERG, a citizen of the United States, residing at Middle River, in the county of Marshall and State of Minnesota, have invented certain new and useful Improvements in Automobile Side Curtains, of which the following is a specification.

This invention relates to automobile side curtains and more particularly to an improved attachment for an automobile and top whereby side curtains may be quickly placed in position on opposite sides of the top.

One of the objects of the invention is to provide roller curtains suspending from the frame of the top and contained in a casing adapted for detachable connection with the body of the automobile whereby the curtains may be properly drawn into position for closing the sides of the top and which will permit the curtains to be contained in a minimum space when not in use.

Another object of the invention is to provide side curtains of this character which are adapted to be disposed in a position when not in use whereby the top may be conveniently folded back without interference from the attachment.

Other objects of the invention will appear upon consideration of the following detail description and accompanying drawings wherein:—

Figure 1:
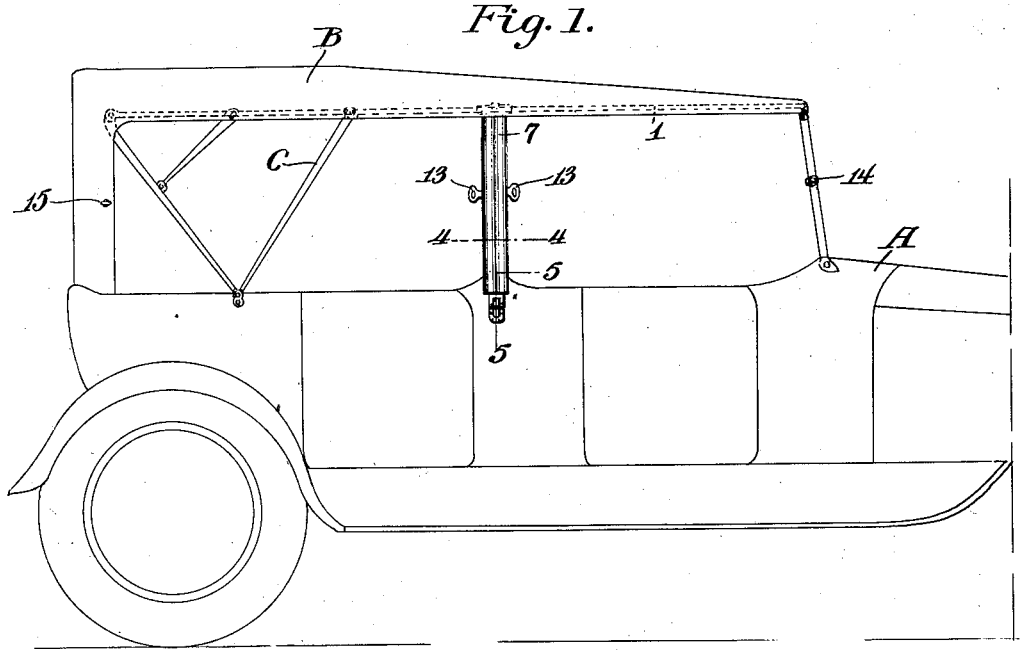
Figure 1 is a side elevation of an automobile showing the invention applied thereto.
Figure 2:
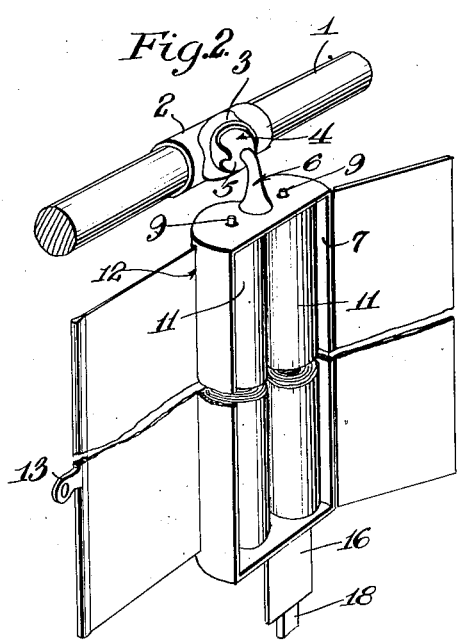
Figure 2 is a perspective view partly broken away and showing the general construction of the attachment.
Figures 3, 4:
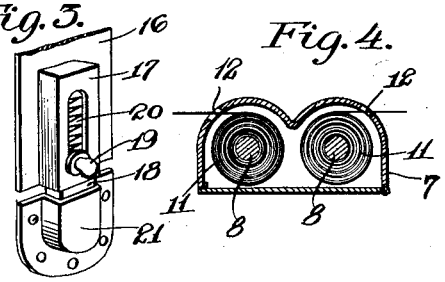
Figure 3 is a perspective view of the latch mechanism for holding the attachment to the body of the automobile.
Figure 4 is a cross section taken on the line 4—4 of Fig. 1.
Figure 5:
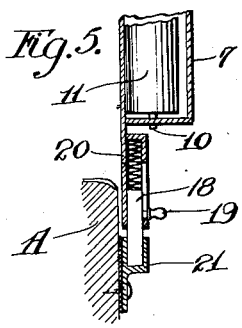
Figure 5 is a vertical fragmentary section taken on the line 5—5 of Fig. 1.
Figure 6:
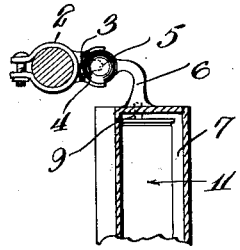
Figure 6 is a detail section through the upper end of the attachment.

Referring to the drawings by numerals, the automobile body A is provided with the usual top B which is supported by the usual collapsible frame C. The frame C includes the longitudinally extending frame bars at opposite sides of the top, one of which is indicated at 1. Attached to this side bar 1 by a clamp 2 is a socket member 3 which forms one of the elements of a ball and socket joint generally designated 4. A ball 5 is lodged in the socket 3 for free swinging movement, thus completing the ball and socket joint 4. The ball has attached thereto or integrally formed therewith the arm 6 which is secured to a casing 7. The casing 7 is preferably constructed of metal or other suitable material of light weight and is shaped to contain two parallel rollers 8 which are disposed vertically in the casing and have their upper pintels 9 journaled in the top of the casing and their lower pintles 10 journaled in the lower end of the casing whereby free rotary movement of the rollers 8 is permitted. The rollers and curtains may be placed in the casing through the side thereof which is open and has a swinging closure adapted to close the casing as shown to advantage in Fig. 2. The rollers 8 are preferably constructed in the manner similar to the construction of the ordinary curtain rollers and the curtains 11 are wound on the rollers in the manner similar to the winding of ordinary window shades so that the curtains may be withdrawn from the casing through the slots or openings 12 and permitting to rewind upon the rollers when the curtains are released. The curtains may be constructed of any suitable fabric such as the rubberized material used for making automobile tops and the free end of each curtain is provided with a perforated tab 13 as shown in Fig. 1. One of the tabs may be fastened to a button 14 on the frame of the wind shield when the curtain is drawn forwardly to enclose the front portion of the automobile. The tab 13 on the other curtain may be attached to the button 15 on the rear section of the top to hold the rearwardly extended curtain in position. Thus the two curtains will entirely close one side of the automobile and it will be obvious that one of the devices will be mounted at each side so that both sides may be entirely closed.

The lower end of the casing 7 is provided with a downwardly extended plate 16 on one side of which a housing 17 is formed. Within the housing 17 is a sliding bolt 18 having a knob 19 connected thereto. The shank of the knob 19 projects through a vertical slot in the housing and the slot limits the outward movement of the bolt, the latter being spring pressed by the spring member 20. Fixed to the automobile body at a point slightly forwardly of the rear door is the bolt socket 21 which receives the end of the bolt 18 when the device is in operative position. This mechanism serves as a latch to releasably hold the lower end of the device in position against the automobile body so that the desired rigidity will be obtained for the casing 7. To release the lower end of the device it is merely necessary to graps the knob 19 and raise the bolt 18 out of the socket 21. The curtains and casing may then be swung upwardly and inwarly against the top of the automobile top so as to extend laterally across the same on the interior thereof. Since one of the devices is mounted at each side it will be obvious that the two free ends will meet within the automobile top and they may be connected together and held by a strap or other convenient means so that they will not interfere with the folding of the top when the collapsible frame is moved to folded position. The ball and socket joint will permit free movement of the device so that the entire structure may be readily swung up beneath the top when not in use. The compact arrangement will permit the top to be readily folded without interfering with either of the devices Some slight changes in the general details of construction may be necessary to adapt the device for different types of automobiles and I desire it to be understood that these slight changes may be made so long as they fall within the scope of the appended claims.

What I claim is:—

A side curtain attachment for automobiles in combination with side frame bars of the automobile top, of a clamp fixed to each of the side frame bars of the top intermediate the ends thereof, a ball and socket joint carried by each of the clamps, a casing suspended from each of the ball and socket joints, parallel curtain rollers mounted in each casing and provided with curtains, a latch bolt carried by the lower ends of each of the casings and adapted to be manually operated, and means mounted on opposite sides of the automobile body to releasably engage the bolts.

In testimony whereof I affix my signature.

MARTIN B. SANBERG.